July 12, 1966     G. F. CARR     3,259,986

TELESCOPE SIGHT FOR TOP-EJECTING FIREARMS

Filed Nov. 20, 1963

INVENTOR.
GIBSON F. CARR
BY Donald R. Motsko

ATTORNEY

United States Patent Office
3,259,986
Patented July 12, 1966

3,259,986
TELESCOPE SIGHT FOR TOP-EJECTING FIREARMS
Gibson F. Carr, Guilford, Conn., assignor to Olin Mathieson Chemical Corporation, a corporation of Virginia
Filed Nov. 20, 1963, Ser. No. 324,921
2 Claims. (Cl. 33—50)

This invention relates to a telescope sight for a top-ejecting firearm.

Many attempts have been made in the past to adapt a telescope sight to top-ejecting firearms, such as the famous Winchester model 94.

One approach has been to provide a mounting arrangement whereby the telescope sight is moved sideways by means of a cam track as the bolt is moved rearwardly to eject a cartridge. This effectively moves the telescope away from the ejecting port. Another approach has been to provide a pivotal mounting for the telescope whereby the shooter manually pivots the scope out of the way before an attempt is made to eject a cartridge. Another classical approach has been to mount the telescope off to one side so that it does not interfere with the ejection of a cartridge. The main objection to this approach is that the scope is mounted in a non-conventional, unfamiliar position which makes its use uncomfortable and awkward to the shooter. Another approach has been to mount the scope in a forward location on the barrel so that the eye piece of the scope is positioned ahead of the ejecting port. The obvious disadvantage of this system is that the telescope is mounted too far away from the shooter's eye, making use of the scope inconvenient.

To my knowledge, none of the prior art attempts to mount a scope on a top-ejecting firearm have attained significant commercial success. The main reasons for this lack of commercial success resides in the difficulties in positioning and aligning the scope, their awkward or inconvenient mounting positions, or the inordinate expense involved in providing for swinging or tilting scopes.

This invention relates to a telescope sight for top-ejecting firearms which is economical to manufacture, convenient to use, and simple to install on readily available commercial top-ejecting firearms. My novel scope is mounted in a conventional position and the eye piece is located in a convenient position for maximum convenience to the shooter.

A preferred embodiment of my invention comprises a telescope sight mounted by conventional brackets directly over the ejecting port of the top-ejecting firearms. An elongated slot is provided intermediate the ends of the telescope directly over the ejecting port to allow cartridges to be ejected upwardly through the elongated slot. The elongated slot in the body of the telescope does not interfere in any way with the function of the telescope or with the function of the firearm in ejecting shells. Conventional telescope sights may be readily modified in accordance with my invention and mounted on a firearm in a conventional manner. Alternatively, a special scope may be provided in which the elongated slots are formed in the body of the scope. In either event, very little or no additional expense is required.

Another embodiment of my invention contemplates the use of a two-piece scope in which the eye piece is mounted in the normally accepted position rearwardly of the top-ejecting port. The main body of the scope including the objective lens and the sighting adjustment mechanism is mounted forward of the top-ejecting port so that a space is provided between the two portions of the scope for allowing a cartridge to be ejected upwardly. This second arrangement requires an additional bracket for the eye piece portion of the scope and may be somewhat more difficult to align on the firearm. However, it does provide a workable alternative to the preferred embodiment of this invention.

This invention will now be described in detail with reference to the accompany drawings in which.

Figure 1:
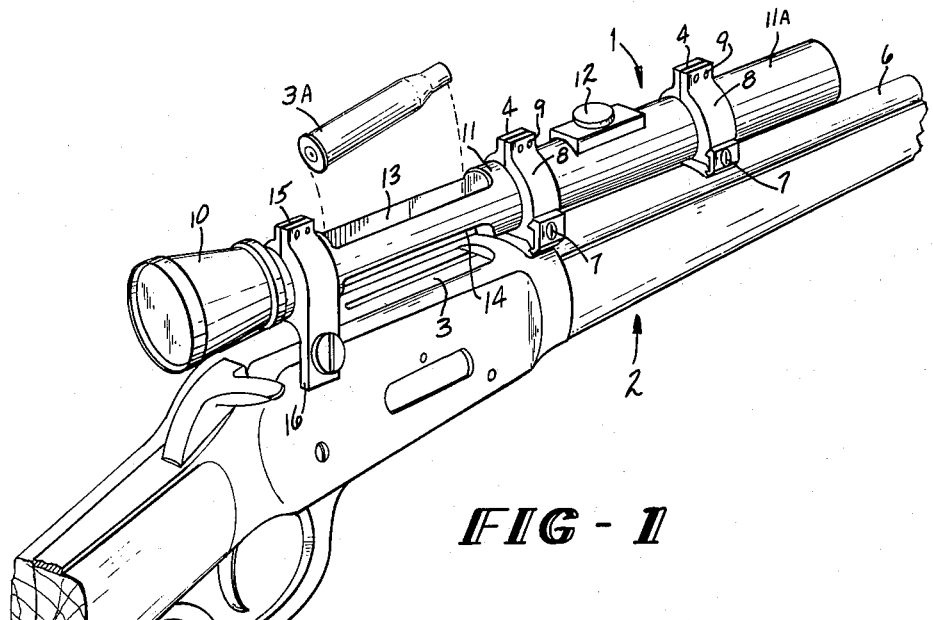
FIGURE 1 is a perspective view showing the details of the preferred embodiment of my invention.
Figure 3:
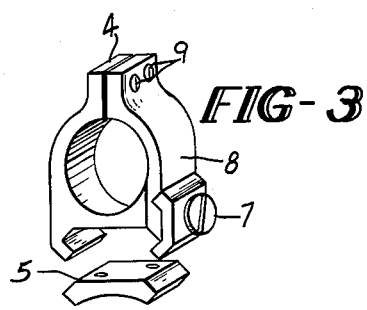
FIGURE 3 is a perspective view of a bracket used for mounting a scope on a firearm.

Referring now to FIGURE 1 of the drawings, I provide a scope generally indicated 1. Scope 1 is mounted on a firearm 2 which has a top-ejecting port 3 positioned in the top of the firearm. When the gun action is operated, a cartridge is ejected upwardly through the ejection port 3. A pair of brackets 4 are provided for mounting scope 3 on the firearm. Brackets 4 are conventional in structure and one embodiment is shown in detail in FIGURE 3. Other known bracket structures are obviously suitable for use with this invention. A pair of bracket mounting plates 5 are mounted on the gun barrel 6 at spaced locations by screw means which extend into threaded openings which have been tapped into the barrel. A bracket 4 is mounted on each of the bracket mounting plates 5 and secured in place by screw 7. Each of the brackets 4 has a tubular body portion 8 which surrounds a portion of the scope. The tubular body portion 8 is of two-piece construction and is tightened about the body of the scope by screw means 9.

The scope 1, shown in FIGURE 1, is conventional in that it includes an eye piece 10, a tubular body portion 11, an adjustment means 12, and an objective lens (not shown) mounted in a forward portion 11A of the scope. The scope 1 is modified by providing an upper slot 13 and a lower slot 14 in the body of the scope directly above the ejecting port 3 of the firearm. Slots 13 and 14 are elongated and dimensioned so that a shell 3A will pass directly from the top-ejecting port up through the scope as illustrated in FIGURE 1. In the embodiment of FIGURE 1, a third bracket 15 may be provided to steady the eye piece and reinforce the system generally. The bracket 15 is similar to brackets 4 except that a leg 16 extends downwardly along the side of the receiver so that the bracket can be secured to the side of the receiver.

It is apparent that the slots 13 and 14 shown in FIGURE 1 may be formed in the scope, or may be cut into a conventional scope.

Figure 2:
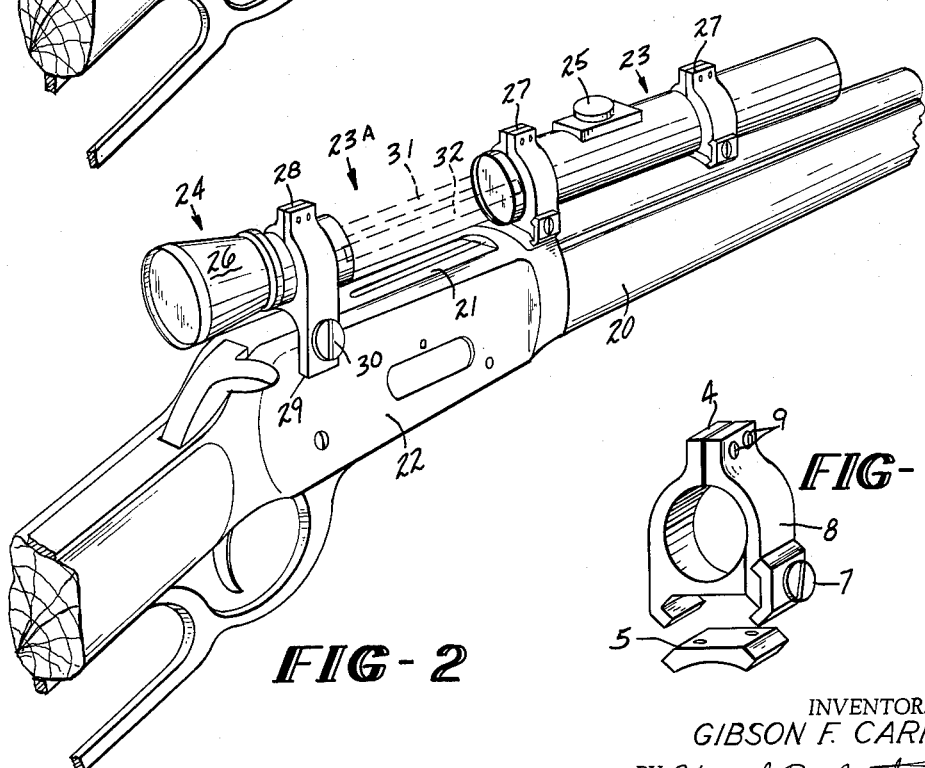
FIGURE 2 is an alternative embodiment in which the scope is made of two separate elements individually and separately mounted on the firearm.

Referring now to FIGURE 2, I provide a telescope sight for a top-ejecting firearm 20. The firearm 20 has an ejection port 21 positioned in the top wall of the receiver 22. A two-piece scope including a forward section 23 and a rearward section 24 is mounted on the firearm. Sections 23 and 24 of the scope are spaced longitudinally to provide an open space 23A directly over the top-ejecting port 21. The forward portion 23 of the scope includes an objective lens (not shown) and an adjusting mechanism 25. The rearward portion 24 of the scope includes an adjustable eye piece 26. The forward portion 23 of the scope is mounted directly above the barrel by a pair of brackets 27 which are identical in structure to the brackets 4 described above. The rearward portion 24 of the scope is connected to the receiver 22 by means of a bracket 28. Bracket 28 includes a pair of depending legs 29 (only one of which is shown) which straddle the receiver and are secured thereto by screw means 30.

Additionally, a pair of side rails 31 and 32 shown in dotted lines in FIGURE 2 may be secured between sections 23 and 24 to rigidify the structure and simplify the alignment of the sections. This arrangement provides an integral structure similar to the FIGURE 1 embodiment.

It is apparent from the description above that as the gun action of the firearm 20 is operated, a cartridge will be ejected upwardly to the ejecting port 21 and will pass through the open space between portions 23 and 24 of the scope unobstructed. This arrangement provides a simple, economical and convenient way of mounting a scope on a top-ejecting firearm.

Although this invention has been described in detail with reference to the preferred embodiments illustrated in the drawing, it is contemplated that various modifications and design changes will be apparent which are within the spirit and scope of the appended claims.

I claim:

1. A telescope sight for a top-ejecting firearm comprising, a rearward portion including an eye piece, a forward portion including an objective lens, said forward and rearward portions joined by a tubular body portion adapted to be positioned over the ejection port of a top-ejecting firearm, said tubular body portion including an upper and lower elongated slot operative to allow a cartridge to be ejected upwardly through the tubular body portion of said scope, means mounting said sight on said firearm, said means being spaced from said slot to provide unobstructed access from said port through said slot.

2. A telescope sight in combination with a firearm having a cartridge-ejecting port positioned in a top wall of the firearm receiver, said telescope sight having a rearward portion including an eye piece, a forward portion including an objective lens, an intermediate tubular body portion joining said forward and rearward portions, said intermediate tubular body portion having an upper and lower elongated opening operatively positioned over said cartridge-ejecting port to allow a cartridge to be ejected upwardly through the telescope sight, means mounting said sight on said firearm, said means being spaced from said opening and said port to allow the unobstructed passage of a cartridge from said port up through said opening.

References Cited by the Examiner

UNITED STATES PATENTS

| 1,060,469 | 4/1931 | Mach | 33—52 X |
| 1,602,116 | 10/1926 | Manahan | 33—50 |

FOREIGN PATENTS

| 80,268 | 4/1895 | Germany. |
| 15,056 | of 1895 | Great Britain. |

LEONARD FORMAN, *Primary Examiner.*

ISAAC LISANN, *Examiner.*

J. D. BOOS, *Assistant Examiner.*